United States Patent
Yeom et al.

(10) Patent No.: US 12,531,272 B2
(45) Date of Patent: Jan. 20, 2026

(54) NON-AQUEOUS ELECTROLYTE FOR LITHIUM SECONDARY BATTERY, AND LITHIUM SECONDARY BATTERY COMPRISING SAME

(71) Applicant: LG Energy Solution, Ltd., Seoul (KR)

(72) Inventors: Chuleun Yeom, Daejeon (KR); Jungmin Lee, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 526 days.

(21) Appl. No.: 18/005,783

(22) PCT Filed: Oct. 14, 2021

(86) PCT No.: PCT/KR2021/014194
§ 371 (c)(1),
(2) Date: Jan. 17, 2023

(87) PCT Pub. No.: WO2022/097945
PCT Pub. Date: May 12, 2022

(65) Prior Publication Data
US 2023/0344003 A1    Oct. 26, 2023

(30) Foreign Application Priority Data
Nov. 3, 2020    (KR) .......................... 10-2020-0144943

(51) Int. Cl.
*H01M 10/0567* (2010.01)
*H01M 10/0568* (2010.01)
(Continued)

(52) U.S. Cl.
CPC ... *H01M 10/0567* (2013.01); *H01M 10/0568* (2013.01); *H01M 10/0569* (2013.01); *H01M 50/46* (2021.01); *H01M 2300/0028* (2013.01)

(58) Field of Classification Search
None
See application file for complete search history.

(56) References Cited

U.S. PATENT DOCUMENTS

| 6,063,522 A | 5/2000 | Hamrock et al. |
| 7,033,707 B2 | 4/2006 | Gan et al. |

(Continued)

FOREIGN PATENT DOCUMENTS

| CN | 102074734 A | 5/2011 |
| JP | 2001256995 A | 9/2001 |

(Continued)

OTHER PUBLICATIONS

Tong B, Song Z, Wan H, et al. Sulfur-containing compounds as electrolyte additives for lithium-ion batteries. InfoMat. 2021; 3(12):1364-1392 (Year: 2021).*

(Continued)

*Primary Examiner* — Maria V Ewald
*Assistant Examiner* — Suhani Jitendra Patel
(74) *Attorney, Agent, or Firm* — Lerner David LLP

(57) ABSTRACT

The present invention provides a non-aqueous electrolyte solution for a lithium secondary battery comprising a lithium salt, an organic solvent and an additive, wherein the additive includes an anion having a sulfone imide group and a propane sultone group or an ethylene sulfate group.

10 Claims, 1 Drawing Sheet

(51) Int. Cl.
  *H01M 10/0569* (2010.01)
  *H01M 50/46* (2021.01)

(56) References Cited

U.S. PATENT DOCUMENTS

| | | | |
|---|---|---|---|
| 2008/0311478 A1 | 12/2008 | Onuki et al. | |
| 2014/0093787 A1* | 4/2014 | Abe | C07D 327/04 |
| | | | 429/188 |
| 2014/0302387 A1 | 10/2014 | Nishizawa et al. | |
| 2014/0370375 A1 | 12/2014 | Nishizawa et al. | |
| 2015/0380768 A1 | 12/2015 | Mizuno et al. | |
| 2016/0380307 A1* | 12/2016 | Akita | H01M 10/0525 |
| | | | 429/144 |
| 2018/0351209 A1* | 12/2018 | Zhan | H01M 10/0568 |
| 2019/0157720 A1* | 5/2019 | Kataoka | H01M 10/0569 |
| 2019/0233388 A1* | 8/2019 | Amine | H01M 10/052 |
| 2019/0393552 A1 | 12/2019 | Kono et al. | |
| 2020/0058960 A1 | 2/2020 | Yu et al. | |
| 2020/0388884 A1* | 12/2020 | Kawakami | H01M 10/4235 |
| 2021/0043972 A1 | 2/2021 | Sugawara et al. | |
| 2021/0313624 A1 | 10/2021 | Morinaka et al. | |

FOREIGN PATENT DOCUMENTS

| | | |
|---|---|---|
| JP | 2002508576 A | 3/2002 |
| JP | 2003059529 A | 2/2003 |
| JP | 2014194871 A | 10/2014 |
| JP | 6353564 B2 | 7/2018 |
| JP | 2019099389 A | 6/2019 |
| JP | 2019179638 A | 10/2019 |
| JP | WO2019146731 A1 | 1/2021 |
| KR | 20190057953 A | 5/2019 |
| KR | 20190080040 A | 7/2019 |
| KR | 20190125345 A | 11/2019 |
| KR | 20200118820 A | 10/2020 |
| WO | 2007072763 A1 | 6/2007 |
| WO | 2013077320 A1 | 5/2013 |
| WO | 2013094602 A1 | 6/2013 |
| WO | 2016027588 A1 | 2/2016 |
| WO | 2019189413 A1 | 10/2019 |
| WO | 2020036222 A1 | 2/2020 |

OTHER PUBLICATIONS

Extended European Search Report including Written Opinion for Application No. 21889410.3 dated Apr. 2, 2024, pp. 1-7.
Haregewoin, Atetegeb Meazah, et al., "Electrolyte additives for lithium ion battery electrodes: progress and perspectives", Energy Environ. Sci., May 2016, 9, pp. 1955-1988.
International Search Report for PCT/KR2021/014194 mailed Jan. 21, 2021. 3 pgs.

* cited by examiner

[FIG. 1]
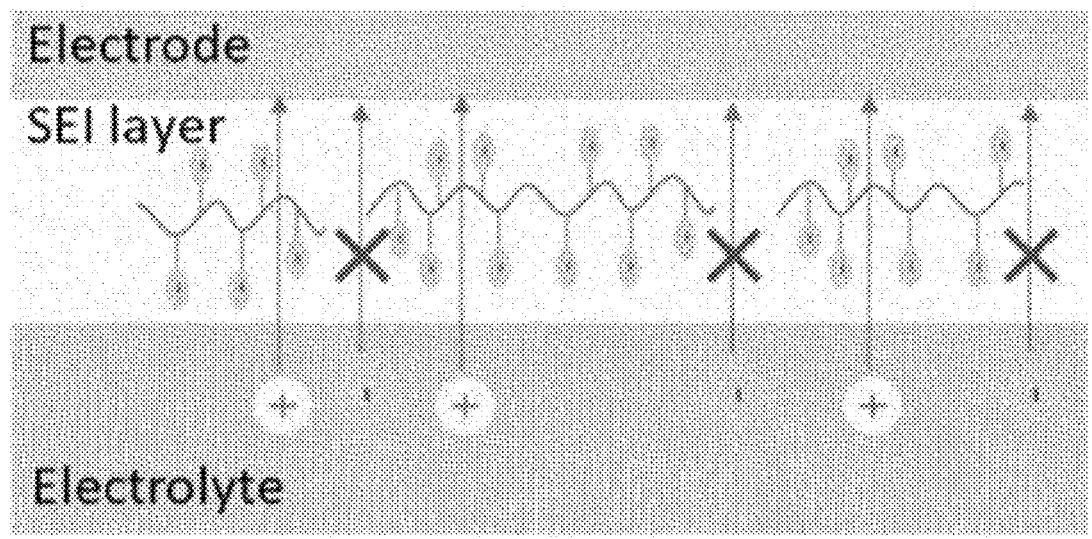
[FIG. 2]
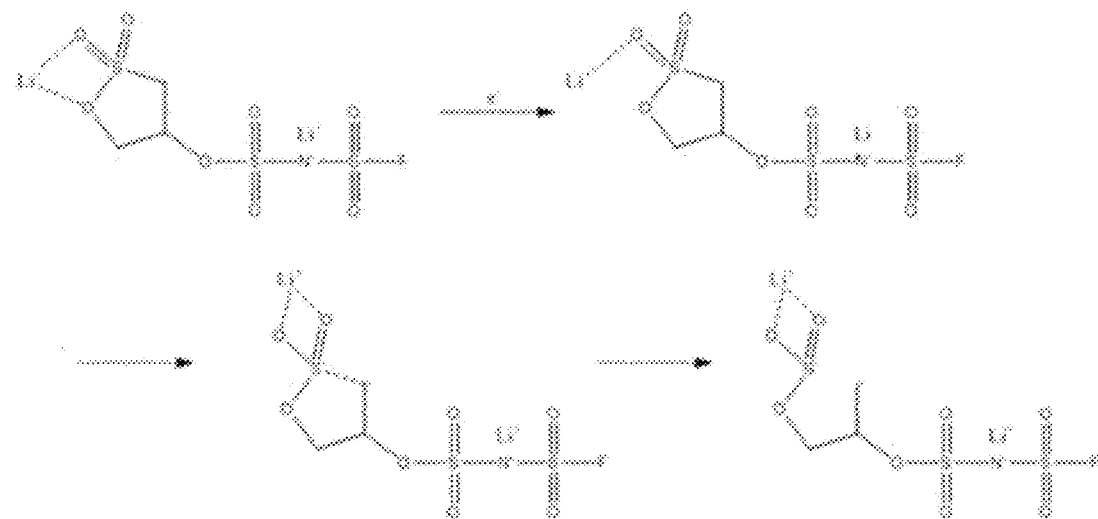

NON-AQUEOUS ELECTROLYTE FOR LITHIUM SECONDARY BATTERY, AND LITHIUM SECONDARY BATTERY COMPRISING SAME

CROSS-REFERENCE TO RELATED APPLICATIONS

The present application is a national stage entry under 35 U.S.C. § 371 of International Application No. PCT/KR2021/014194 filed on Oct. 14, 2021, which claims priority from Korean Patent Application No. 10-2020-0144943 filed on Nov. 3, 2020, all the disclosures of which are incorporated herein by reference.

TECHNICAL FIELD

The present invention relates to a non-aqueous electrolyte solution for a lithium secondary battery which can achieve lifetime improvement and high-rate charging/discharging through continuous suppression of decomposition of electrolyte solution by forming a stable film on the positive/negative electrode under high voltage, and a lithium secondary battery comprising the same.

BACKGROUND ART

Recently, mobile electronic devices have been widely distributed, and accordingly, with the rapid miniaturization, weight reduction, and thinning of these mobile electronic devices, there is a strong demand for a battery that is the power source to be small and lightweight, and also for the development of a secondary battery that can charge/discharge for a long time and have excellent high-rate characteristics.

A lithium battery, specifically, a lithium-ion battery (LIB) is a battery capable of best meeting these needs, and has high energy density and is easy to design, so it is being adopted as a power source for many portable devices. Recently, as the lithium-ion battery has been adopted as a power source for electric vehicles or power storage in addition to small electronic devices such as portable IT devices, there is a rise in research to maintain excellent performance not only at room temperature but also in harsher external environments such as high or low temperature environments.

On the other hand, lithium secondary batteries are mostly composed of negative and positive electrodes capable of intercalating and deintercalating lithium ions, and a non-aqueous electrolyte solution in which lithium salts such as $LiPF_6$ and $LiBF_4$ are dissolved in an appropriate amount in a mixed carbonate-based organic solvent.

In the lithium secondary battery, as charging/discharging is proceeded, the positive electrode active material is structurally collapsed and metal ions are leached from the surface of the positive electrode. The leached metal ions are electrically positioned on the negative electrode and deteriorate the negative electrode. This deterioration phenomenon tends to be accelerated when the potential of the positive electrode is increased or the battery is exposed to high temperatures.

In order to solve these problems, a method of adding compounds capable of forming a protective film, that is, the SEI film on the surface of the negative electrode, to a non-aqueous electrolyte solution has been proposed. However, as other side effects occur due to the compounds added to the electrolyte solution, there may be another problem that the overall performance of the secondary battery is reduced.

Therefore, there is a continuous demand for the development of a non-aqueous electrolyte solution containing an additive capable of improving the performance and stability of a battery while minimizing side effects.

In addition, in a lithium secondary battery, there is a disadvantage in that a low voltage phenomenon (voltage drop) occurs due to foreign substances contained in raw materials or mixed in the process, and this phenomenon is aggravated by a minute short circuit in the battery, and thus the operation of the cell is stopped. This disadvantage is a defect in the final stage of the manufacturing process, so the loss is large.

PRIOR ART DOCUMENTS

Patent Documents (Patent Document 1) Japanese Patent Publication No. 2001-256995
(Patent Document 2) U.S. Pat. No. 7,033,707
(Patent Document 3) Japanese Patent Publication No. 2003-059529

DISCLOSURE

Technical Problem

In order to solve the conventional problems, the present invention is intended to provide a non-aqueous electrolyte solution for a lithium secondary battery capable of suppressing side effects caused by foreign metal materials inside the battery, while forming a stable film on the surface of an electrode, by incorporating a lithium salt containing an anion having a sulfone imide group and a propane sultone group or an ethylene sulfate group as an additive to the non-aqueous electrolyte solution for the lithium secondary battery, and a lithium secondary battery including the same.

In addition, the present invention is intended to provide a lithium secondary battery having excellent high-rate charging/discharging by forming a stable film on the surface of the electrode, and thus fixing anions that hinder the transport of lithium to the film of the electrode to reduce the resistance of the film, and improving the transport rate of lithium ions.

Technical Solution

In order to achieve the above objects, the present invention provides a non-aqueous electrolyte solution for a lithium secondary battery comprising an electrolyte salt, an organic solvent and an additive, wherein the additive is a lithium salt containing an anion having a sulfone imide group and a propane sultone group or an ethylene sulfate group.

In addition, the present invention provides a non-aqueous electrolyte solution for a secondary battery, wherein the additive is a lithium salt represented by Chemical Formula 1 below:

[Chemical Formula 1]

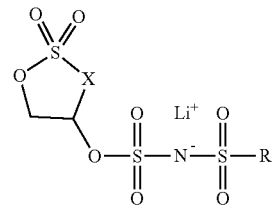

wherein,

X is CH$_2$ or O, and

R is hydrogen, fluorine, or an alkyl group having 1 to 4 carbon atoms substituted with a fluorine.

In addition, the present invention provides a non-aqueous electrolyte solution for a lithium secondary battery, wherein, in Chemical Formula 1, R is F or CF$_3$.

In addition, the present invention provides a non-aqueous electrolyte solution for a lithium secondary battery, wherein Chemical Formula 1 is represented by any one of Chemical Formulas A to D below:

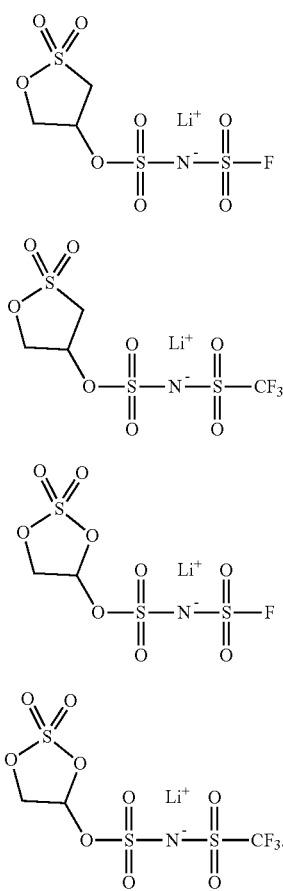

[Chemical Formula A]

[Chemical Formula B]

[Chemical Formula C]

[Chemical Formula D]

In addition, the present invention provides a non-aqueous electrolyte solution for a lithium secondary battery, wherein the additive is contained in an amount of 0.01 wt. % to 10 wt. % based on the total weight.

In addition, the present invention provides a non-aqueous electrolyte solution for a lithium secondary battery, wherein the electrolyte salt is selected from the group consisting of LiCl, LiBr, LiI, LiBF$_4$, LiClO$_4$, LiB$_{10}$Cl$_{10}$, LiAlCl$_4$, LiAlO$_4$, LiPF$_6$, LiCF$_3$SO$_3$, LiCH$_3$CO$_2$, LiCF$_3$CO$_2$, LiAsF$_6$, LiSbF$_6$, LiCH$_3$SO$_3$, LiFSI (Lithium bis(fluorosulfonyl)imide, LiN(SO$_2$F)$_2$), LiBETI(lithium bis(perfluoroethanesulfonyl)imide, LiN (SO$_2$CF$_2$CF$_3$)$_2$) and LiTFSI (lithium bis(trifluoromethanesulfonyl)imide, LiN (SO$_2$CF$_3$)$_2$).

In addition, the present invention provides a non-aqueous electrolyte solution for a lithium secondary battery, wherein the concentration of the electrolyte salt is 0.1M to 3M.

In addition, the present invention provides a non-aqueous electrolyte solution for a lithium secondary battery, wherein the organic solvent includes at least one selected from the group consisting of ethers, esters, amides, linear carbonates, and cyclic carbonates.

In addition, the present invention provides a non-aqueous electrolyte solution for a lithium secondary battery, wherein the lithium secondary battery has an operating voltage of 4.0V or more.

In addition, the present invention provides a lithium secondary battery comprising a positive electrode, a negative electrode, a separator disposed between the positive electrode and the negative electrode and the non-aqueous electrolyte solution for the lithium secondary battery.

Advantageous Effects

The non-aqueous electrolyte solution for lithium secondary battery according to the present invention exhibits the effect of forming a stable film in the form, in which anions are fixed, on the surface of the electrode by containing a lithium salt including an anion having a sulfone imide group and a propane sultone group or an ethylene sulfate group as an additive.

In addition, the lithium secondary battery containing the non-aqueous electrolyte solution for the lithium secondary battery according to the present invention exhibits lifetime improvement and excellent charging/discharging characteristics through continuous suppression of decomposition of electrolyte solution by forming a stable film on the surface of the electrode even under high voltage.

DESCRIPTION OF DRAWINGS

FIG. 1 is a schematic diagram showing the formation and operation mechanism of an electrode film (Solid Electrolyte Interphase, SEI) by the additive of the present invention.

FIG. 2 is a reaction scheme showing the reductive decomposition mechanism of the additive according to Example 1 of the present invention. From this, it can be confirmed that the radicals and anions generated through the above mechanism may further react with a solvent or additive to form a polymer film.

BEST MODE

The embodiments provided according to the present invention can all be achieved by the following description. It is to be understood that the following description is to be understood as describing preferred embodiments of the present invention, and the present invention is not necessarily limited thereto.

The present invention provides a non-aqueous electrolyte solution for a lithium secondary battery comprising an electrolyte salt, an organic solvent and an additive, wherein the additive is a lithium salt containing an anion having a sulfone imide group and a propane sultone group or an ethylene sulfate group.

The lithium salt containing an anion having a sulfone imide group and a propane sultone group or an ethylene sulfate group as the additive may be a lithium salt represented by Chemical Formula 1 below:

[Chemical Formula 1]

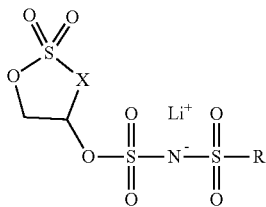

wherein,

X is CH₂ or O, and

R is hydrogen, fluorine, or an alkyl group having 1 to 4 carbon atoms substituted with a fluorine.

Also, in Chemical Formula 1, R above may be fluorine or an alkyl group having 1 to 4 carbon atoms substituted with a fluorine, preferably a fluoro group (—F) or a trifluoromethyl group (—CF₃), more preferably a fluoro group (—F).

In addition, the lithium salt represented by Chemical Formula 1 may more preferably be any one of the lithium salts represented by any one of Chemical Formula A to Chemical Formula D below:

[Chemical Formula A]

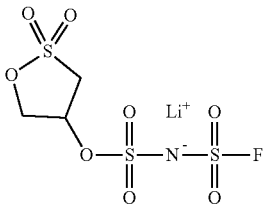

[Chemical Formula B]

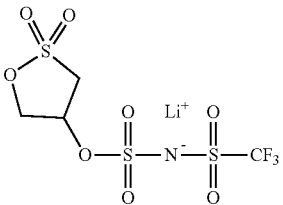

[Chemical Formula C]

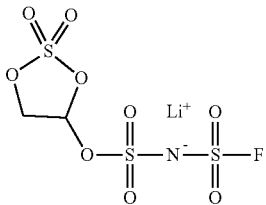

[Chemical Formula D]

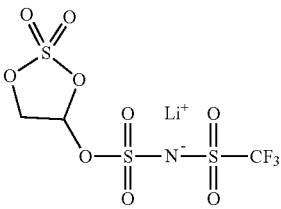

The non-aqueous electrolyte solution for lithium secondary battery of the present invention can form a stable film in the form in which anions are fixed on the surface of the electrode, by incorporating a lithium salt containing an anion having a sulfone imide group and a propane sultone group or an ethylene sulfate group as the additive. For this reason, the lithium secondary battery containing the additive forms a stable film on the surface of the electrode even under high voltage, thereby improving the lifetime through continuous suppression of the decomposition of the electrolyte solution and exhibiting excellent charging/discharging characteristics.

In addition, the non-aqueous electrolyte solution for lithium secondary battery of the present invention may further comprise an additive selected from the group consisting of lithium difluorooxalatoborate (LiFOB), lithium bis(oxalate)borate (LiB(C₂O₄)₂, LiBOB), fluoroethylene carbonate (FEC), vinylene carbonate (VC), vinylethylene carbonate (VEC), divinyl sulfone, ethylene sulfite, propylene sulfite, diallyl sulfonate, ethane sultone, propane sultone (PS), butane sultone, ethene sultone, butene sultone and propene sultone (PRS).

In addition, the content of the lithium salt containing an anion having a sulfone imide group and a propane sultone group or an ethylene sulfate group may be 0.01 wt. % to 10 wt. %, preferably 0.01 wt. % to 5 wt. %, more preferably 0.1 wt. % to 3 wt. %, based on the total weight of the electrolyte solution. If the content of the lithium salt is less than the above range, the formation and stabilization effect of a film (Solid Electrolyte Interphase, SEI) on the electrode surface is insignificant. If the content of the lithium salt exceeds the above range, there may be a problem in that the resistance due to the excess additive is increased. Therefore, the content of the lithium salt preferably satisfies the above range.

The non-aqueous electrolyte solution for the lithium secondary battery of the present invention may contain an electrolyte salt, and the lithium salt may comprise at least one selected from the group consisting of LiCl, LiBr, LiI, LiBF₄, LiClO₄, LiB₁₀Cl₁₀, LiAlCl₄, LiAlO₄, LiPF₆, LiCF₃SO₃, LiCH₃CO₂, LiCF₃CO₂, LiAsF₆, LiSbF₆, LiCH₃SO₃, LiFSI (Lithium bis(fluorosulfonyl)imide, LiN(SO₂F)₂), LiBETI (lithium bis(perfluoroethanesulfonyl)imide, LiN(SO₂CF₂CF₃)₂) and LiTFSI(lithium bis(trifluoromethanesulfonyl)imide, LiN(SO₂CF₃)₂).

The concentration of the electrolyte salt may be 0.1M to 3.0M, preferably 0.5M to 2.5M, and more preferably 0.8M to 2.0M. If the concentration of the electrolyte salt is less than 0.1M, the conductivity of the electrolyte solution is lowered, and the performance of the electrolyte solution is deteriorated. If the concentration of the electrolyte salt is more than 3.0M, there is a problem in that the viscosity of the electrolyte solution is increased and the mobility of lithium ions is decreased. Therefore, the concentration of the electrolyte salt preferably satisfies the above range. The electrolyte salt acts as a source of lithium ions in the battery to enable the operation of a basic lithium secondary battery.

In addition, as the electrolyte salt of the non-aqueous electrolyte solution for the lithium secondary battery of the present invention, a lithium imide salt and a lithium salt other than the lithium imide salt may be mixed and used.

The lithium imide salt may be at least one selected from the group consisting of LiFSI(Lithium bis(fluorosulfonyl)imide, LiN(SO₂F)₂), LiBETI (lithium bis(perfluoroethanesulfonyl)imide, LiN(SO₂CF₂CF₃)₂) and LiTFSI(lithium bis(trifluoromethanesulfonyl)imide, LiN(SO₂CF₃)₂), and the lithium salt other than the lithium imide salt may be at least one selected from the group consisting of LiCl, LiBr, LiI, LiBF₄, LiClO₄, LiB₁₀Cl₁₀, LiAlCl₄, LiAlO₄, LiPF₆, LiCF₃SO₃, LiCH₃CO₂, LiCF₃CO₂, LiAsF₆, LiSbF₆, and LiCH₃SO₃.

In addition, the molar ratio of the lithium imide salt to a lithium salt other than the lithium imide salt may be 1:1 to 7:1, preferably 1:1 to 6:1, more preferably 1:1 to 4:1. The lithium imide salt and the lithium salt other than the lithium imide salt can stably form a film that can suppress the corrosion of the current collector while suppressing the side reaction of the electrolyte solution by satisfying the molar ratio.

The non-aqueous electrolyte solution for the lithium secondary battery of the present invention may include an organic solvent, and the organic solvent is a solvent commonly used in lithium secondary batteries, and for example, an ether compound, an ester (acetates, propionates) compound, an amide compound, a linear carbonate, or a cyclic carbonate compound may be used alone or in combination of two or more.

Among the compounds listed above, a mixture of linear carbonates and cyclic carbonates may be preferably used as the organic solvent. If the mixture of the linear carbonate and the cyclic carbonate is used as an organic solvent, dissociation and movement of the lithium salt can be facilitated. In this case, the cyclic carbonate-based compound and the linear carbonate-based compound are mixed in a volume ratio of 1:9 to 6:4, preferably 1:9 to 4:6, more preferably 2:8 to 4:6.

On the other hand, the linear carbonate compound may be, as a specific example, one compound selected from the group consisting of dimethyl carbonate (DMC), diethyl carbonate (DEC), dipropyl carbonate (DPC), ethylmethyl carbonate (EMC), methylpropyl carbonate (MPC) and ethylpropyl carbonate (EPC) or a mixture of at least two or more thereof, but is not limited thereto.

In addition, the cyclic carbonate compound may be, as a specific example, one compound selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate and halides thereof, or a mixture of at least two or more thereof.

The lithium secondary battery of the present invention may have an operating voltage of 4.0V or more, preferably 4.2V or more, and more preferably 4.25V or more. If the operating voltage of the lithium secondary battery is less than 4.0V, the difference according to the addition of the additive of the present invention is not large. However, in a lithium secondary battery having an operating voltage of 4.0V or higher, the effect of rapidly increasing the high temperature storage and lifetime characteristics according to the addition of the additive appears.

Lithium Secondary Battery

Hereinafter, the lithium secondary battery according to the present invention will be described.

The lithium secondary battery of the present invention comprises a positive electrode, a negative electrode, a separator, and a non-aqueous electrolyte solution for a lithium secondary battery. More specifically, the lithium secondary battery of the present invention comprises at least one positive electrode, at least one negative electrode, and a separator that can be selectively interposed between the positive electrode and the negative electrode, and the non-aqueous electrolyte solution for the lithium secondary battery. At this time, since the non-aqueous electrolyte solution for the lithium secondary battery is the same as the above description, a detailed description thereof will be omitted.

(1) Positive Electrode

The positive electrode may be prepared by coating a slurry of a positive electrode active material comprising a positive electrode active material, a binder for electrode, an electrically conductive material for electrode, and a solvent on the positive electrode current collector.

The positive electrode current collector is not particularly limited as long as it has electrical conductivity without causing chemical changes in the battery. For example, stainless steel, aluminum, nickel, titanium, sintered carbon; or aluminum or stainless-steel surface-treated with carbon, nickel, titanium, silver or the like may be used as the positive electrode current collector. At this time, the positive electrode current collector may form fine irregularities on the surface to strengthen the bonding force of the positive electrode active material, and may be used in various forms such as film, sheet, foil, net, porous body, foam, nonwoven fabric and the like.

The positive electrode active material is a compound capable of reversibly intercalating and deintercalating lithium, and specifically, may comprise lithium composite metal oxide comprising lithium and at least one metal such as cobalt, manganese, nickel or aluminum. More specifically, the lithium composite metal oxide may be lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y1}Mn_{Y1}O_2$ (wherein $0<Y1<1$), $LiMn_{2-z1}Ni_{z1}O_4$ (wherein $0<Z1<2$) etc.), lithium-nickel-cobalt-based oxide (e.g., $LiNi_{1-Y2}Co_{Y2}O_2$ (wherein $0<Y2<1$) etc.), lithium-manganese-cobalt-based oxide (e.g., $LiCo_{1-Y3}Mn_{Y3}O_2$ (wherein $0<Y3<1$), $LiMn_{2-z2}Co_{z2}O_4$ (wherein $0<Z2<2$) etc.), lithium-nickel-manganese-cobalt-based oxide (e.g., $Li(Ni_{p1}Co_{q1}Mn_{r1})O_2$ (wherein $0<p1<1$, $0<q1<1$, $0<r1<1$, $p1+q1+r1=1$) or $Li(Ni_{p2}Co_{q2}Mn_{r2})O_4$ (wherein $0<p2<2$, $0<q2<2$, $0<r2<2$, $p2+q2+r2=2$) etc.), or lithium-nickel-cobalt-transition metal (M) oxide (e.g., $Li(Ni_{p3}Co_{q3}Mn_{r3}M_{S1})O_2$ (wherein M is selected from the group consisting of Al, Fe, V, Cr, Ti, Ta, Mg and Mo, p3, q3, r3 and s1 is the atomic fraction of each independent element, wherein $0<p3<1$, $0<q3<1$, $0<r3<1$, $0<s1<1$, and $p3+q3+r3+s1=1$) etc.), and any one or two or more of these compounds may be comprised.

Among these, when considering that the capacity characteristics and stability of the battery can be increased, the lithium composite metal oxide may be $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$ etc.), or lithium nickel cobalt aluminum oxide (e.g., $LiNi_{0.8}Co_{0.15}Al_{0.05}O_2$ etc.), and when considering the remarkable improvement effect according to the control of the type and content ratio of elemental elements forming lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$ or $Li(Ni_{0.8}Mn_{0.1}Co_{0.1})O_2$, and any one or a mixture of two or more of these may be used.

The binder for the electrode is a component that assists in bonding between a positive electrode active material and an electrically conductive material for an electrode and bonding to a current collector. Specifically, the binder may be polyvinylidene fluoride, polyvinyl alcohol, carboxymethylcellulose (CMC), starch, hydroxypropyl cellulose, regenerated cellulose, polyvinyl pyrrolidone, polytetrafluoroethylene, polyethylene (EP), polypropylene, ethylene-propylene-diene terpolymer (EPDM), sulfonated-EPDM, styrene-butadiene rubber, fluorine rubber, and various copolymers thereof, and the like.

The electrically conductive material for the electrode is a component for further improving the conductivity of the positive electrode active material. The electrically conductive material for the electrode is not particularly limited as long as it has conductivity without causing chemical change in the battery, and for example, graphite; carbon-based material such as carbon black, acetylene black, Ketjen black, channel black, furnace black, lamp black, and thermal black; electrically conductive fibers such as carbon fibers and metal fibers; metal powders such as carbon fluoride, aluminum, and nickel powder; electrically conductive whiskers such as zinc oxide and potassium titanate; electrically conductive metal oxides such as titanium oxide; electrically conductive materials such as polyphenylene derivatives, etc. can be used. Specific examples of commercially available electrically-conductive materials may include acetylene black series of products from Chevron Chemical Company or Denka black (Denka Singapore Private Limited), products from Gulf Oil Company, Ketjen black, EC series (products from Armak Company), Vulcan XC-72 (products from Cabot Company) and Super P (products of Timcal Company).

The solvent may comprise an organic solvent such as N-methyl-2-pyrrolidone (NMP), and may be used in an amount to achieve a desirable viscosity when comprising the positive electrode active material, and optionally the binder for the positive electrode, the positive electrode electrically conductive material, and the like.

(2) Negative Electrode

In addition, the negative electrode may be prepared by coating a slurry of a negative electrode active material comprising a negative electrode active material, a binder for an electrode, an electrically conductive material for an electrode, and a solvent on a negative electrode current collector. Meanwhile, as the negative electrode, a metal negative electrode current collector itself may be used as an electrode.

This negative electrode current collector is not particularly limited as long as it has high electrical conductivity without causing chemical changes in the battery, and for example, copper, stainless steel, aluminum, nickel, titanium, sintered carbon; copper or stainless steel whose surface is treated with carbon, nickel, titanium, silver or the like; aluminum-cadmium alloy or the like may be used as the negative electrode current collector. In addition, as with the positive electrode current collector, the negative electrode current collector can be strengthened in the bonding force with the negative electrode active material by forming fine irregularities on the surface, and can be used in various forms such as film, sheet, foil, net, porous body, foam, nonwoven fabric and the like.

The negative electrode active material may be at least one negative electrode active materials selected from the group consisting of natural graphite, artificial graphite, carbonaceous materials; lithium-containing titanium composite oxide (LTO), Si, Sn, Li, Zn, Mg, Cd, Ce, Ni, or Fe metals (Me); alloys composed of the above metals (Me); oxides (MeO$_x$) of the above metals (Me); and a composite of the above metals (Me) and carbon.

Since the binder for the electrode, the electrically conductive material for the electrode, and the solvent are the same as those described above, a detailed description thereof will be omitted.

(3) Separator

As a separator, a conventional porous polymer film conventionally used as a separator, for example, a porous polymer film made of a polyolefin-based polymer such as ethylene homopolymer, propylene homopolymer, ethylene/butene copolymer, ethylene/hexene copolymer, and ethylene/methacrylate copolymer may be used alone or they may be laminated and used, or a conventional porous nonwoven fabric, for example, a non-woven fabric made of high melting glass fibers, polyethylene terephthalate fibers, or the like may be used, but is not limited thereto.

Hereinafter, preferred examples are presented to help the understanding of the present invention, but the following examples are provided only to make the present invention easier to understand, and the present invention is not limited thereto.

Example

1. Example 1

(1) Preparation of Non-Aqueous Electrolyte Solution for Lithium Secondary Battery Ethylene carbonate (EC): ethylmethyl carbonate (EMC) was mixed in a volume ratio of 30:70, and then LiPF$_6$ (lithium hexafluorophosphate) was dissolved to a concentration of 1.0M to prepare a non-aqueous organic solvent, and then LiN(FSO$_2$)$_2$ (lithium bis(fluorosulfonyl)imide, LiFSI) was added in an amount of 0.3 wt. %. 1 g of lithium salt represented by Chemical Formula A below as an additive was added to 99 g of the non-aqueous organic solvent to prepare a non-aqueous electrolyte solution for a lithium secondary battery:

[Chemical Formula A]

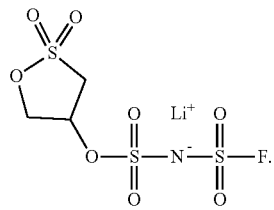

(2) Manufacture of Lithium Secondary Battery

A positive electrode active material (LiNi$_{0.6}$Co$_{0.6}$Mn$_{0.202}$; NCM622), carbon black as an electrically conductive material, and polyvinylidene fluoride (PVDF) as a binder are mixed in a weight ratio of 94:3:3, and then the mixture was added to N-methyl-2-pyrrolidone (NMP) as a solvent to prepare a slurry of positive electrode active material. The slurry of the positive electrode active material is applied to an aluminum (Al) thin film that is a positive electrode current collector having a thickness of about 20 μm, dried to prepare a positive electrode, and then a roll press is performed to prepare a positive electrode.

Graphite as a negative electrode active material, polyvinylidene difluoride (PVDF) as a binder, and carbon black as an electrically conductive material were mixed in a 95:2:3 weight ratio, and then the mixture was added to N-methyl-2-pyrrolidone (NMP) as a solvent to prepare a slurry of negative electrode active material. The slurry of the negative electrode active material is applied to a copper (Cu) thin film that is a negative electrode current collector having a thickness of 10 μm, dried to prepare a negative electrode, and then roll press was performed to prepare a negative electrode.

The positive electrode, the negative electrode, and a separator consisting of polypropylene/polyethylene/polypropylene (PP/PE/PP) were stacked in the order of positive electrode/separator/negative electrode, and the stacked structure was placed in a pouch-type battery case, and then the non-aqueous electrolyte solution for the lithium secondary battery was injected to prepare a lithium secondary battery.

2. Example 2

A non-aqueous electrolyte solution for a lithium secondary battery and a lithium secondary battery were prepared in the same manner as in Example 1, except that 3 g of the lithium salt represented by Chemical Formula A as an additive was added to 97 g of the non-aqueous organic solvent.

3. Example 3

A non-aqueous electrolyte solution for a lithium secondary battery and a lithium secondary battery were prepared in the same manner as in Example 1, except that as an additive, 1 g of the lithium salt represented by Chemical Formula B below was added instead of 1 g of the lithium salt represented by Chemical Formula A:

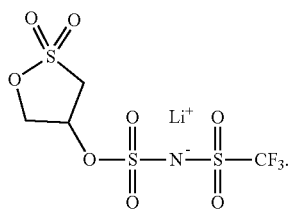

[Chemical Formula B]

4. Example 4

A non-aqueous electrolyte solution for a lithium secondary battery and a lithium secondary battery were prepared in the same manner as in Example 1, except that as an additive, 1 g of the lithium salt represented by Chemical Formula C below was added instead of 1 g of the lithium salt represented by Chemical Formula A:

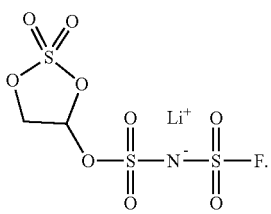

[Chemical Formula C]

5. Example 5

A non-aqueous electrolyte solution for a lithium secondary battery and a lithium secondary battery were prepared in the same manner as in Example 1, except that as an additive, 1 g of the lithium salt represented by Chemical Formula D below was added instead of 1 g of the lithium salt represented by Chemical Formula A:

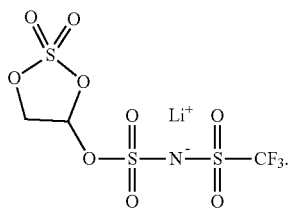

[Chemical Formula D]

Comparative Example

1. Comparative Example 1

A non-aqueous electrolyte solution for a lithium secondary battery and a lithium secondary battery were prepared in the same manner as in Example 1, except that when preparing the electrolyte solution for the lithium secondary battery, the lithium salt represented by Chemical Formula A was not used as an additive.

2. Comparative Example 2

A non-aqueous electrolyte solution for a lithium secondary battery and a lithium secondary battery were prepared in the same manner as in Example 1, except that as an additive, 15 g of the lithium salt represented by Chemical Formula A was added.

3. Comparative Example 3

A non-aqueous electrolyte solution for a lithium secondary battery and a lithium secondary battery were prepared in the same manner as in Example 1, except that as an additive, 1 g of 1,3-propanesultone was added instead of 1 g of the lithium salt represented by Chemical Formula A.

4. Comparative Example 4

A non-aqueous electrolyte solution for a lithium secondary battery and a lithium secondary battery were prepared in the same manner as in Example 1, except that as an additive, 1 g of ethylene sulfate was added instead of 1 g of the lithium salt represented by Chemical Formula A.

5. Comparative Example 5

A non-aqueous electrolyte solution for a lithium secondary battery and a lithium secondary battery were prepared in the same manner as in Example 1, except that as an additive, 1 g of Comparative Compound (a) below was added instead of 1 g of the lithium salt represented by Chemical Formula A:

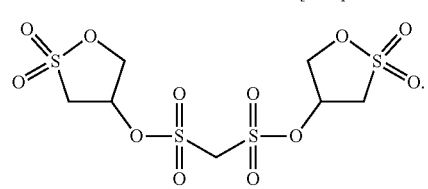

[Comparative Compound a]

The components and contents of the additives used in Examples 1 to 5 and Comparative Examples 1 to 5 are shown in Table 1 below.

TABLE 1

| Experimental Example | Type of additive | Content of additive (wt. %) |
|---|---|---|
| Example 1 | Chemical Formula A | 1 |
| Example 2 | Chemical Formula A | 3 |
| Example 3 | Chemical Formula B | 1 |
| Example 4 | Chemical Formula C | 1 |
| Example 5 | Chemical Formula D | 1 |
| Comparative Example 1 | — | 0 |
| Comparative Example 2 | Chemical Formula A | 15 |
| Comparative Example 3 | 1,3-propanesultone | 1 |
| Comparative Example 4 | ethylene sulfate | 1 |
| Comparative Example 5 | Comparative Compound (a) | 1 |

1. Experimental Example 1: Evaluation of Capacity Characteristics

The lithium secondary batteries of Examples 1 to 5 and Comparative Examples 1 to 5 were charged at room temperature under 0.33 C/4.25V constant current/constant voltage (CC/CV) conditions to 4.25V/0.05 C mA, and discharged under 0.33 C constant current (CC) condition to 3V to measure the initial discharging capacity.

Thereafter, the lithium secondary batteries were charged up to 4.25V/0.05 C mA under 0.33 C/4.25V constant current/constant voltage (CC/CV) conditions at room temperature, and discharged to 3V under 0.33 C constant current (CC) condition; this process was repeated 300 times to measure the discharging capacity. The discharging capacity at this time was defined as the final discharging capacity. The capacity retention rate (%) calculated by substituting each of the measured values of the initial discharging capacity and the final discharging capacity into Equation 1 below is shown in Table 2.

Capacity retention rate (%)=Final discharging capacity (mAh)/Initial discharging capacity (mAh)   [Equation 1]

TABLE 2

| | Initial discharging capacity (mAh) | Final discharging capacity (mAh) | Capacity retention rate (%) |
|---|---|---|---|
| Example 1 | 2108.6 | 1939.912 | 92.0% |
| Example 2 | 2105 | 1926.075 | 91.5% |
| Example 3 | 2103.8 | 1920.769 | 91.3% |
| Example 4 | 2100.9 | 1911.819 | 91.0% |
| Example 5 | 2098 | 1898.69 | 90.5% |
| Comparative Example 1 | 2091.3 | 1863.348 | 89.1% |
| Comparative Example 2 | 2085.8 | 1827.161 | 87.6% |
| Comparative Example 3 | 2083.3 | 1779.138 | 85.4% |
| Comparative Example 4 | 2079.9 | 1769.995 | 85.1% |
| Comparative Example 5 | 2050.6 | 1714.302 | 83.6% |

Referring to Table 2, it can be seen that in the case of the lithium secondary batteries according to Examples 1 to 5, all the initial discharging capacities, the final discharging capacities, and the capacity retention rates are improved compared to those of the lithium secondary batteries according to Comparative Examples 1 to 5.

2. Experimental Example 2: Evaluation of the Rate of Increase in Resistance

In order to evaluate the resistance of lithium secondary batteries manufactured according to Examples 1 to 5 and Comparative Examples 1 to 5, the initial resistance when charged to a state of charge (SOC) of 50% after activating the lithium secondary batteries was measured. Thereafter, the lithium secondary batteries were charged up to 4.25V/0.05 C mA at room temperature under 0.33 C/4.25V constant current/constant voltage (CC/CV) conditions, and discharged to 3V under 0.33 C constant current (CC) condition; this process was repeated 300 times, and then the SOC was adjusted to 50% to measure the resistance. This is defined as the final resistance. The rate of increase in resistance (%) calculated by substituting the initial resistance and the final resistance into Equation 2 is shown in Table 3 below.

Rate of increase in resistance (%)={(Final resistance Initial resistance)/Initial resistance}×100(%)   [Equation 2]

TABLE 3

| | Rate of increase in resistance (%) |
|---|---|
| Example 1 | 8.3 |
| Example 2 | 8.7 |
| Example 3 | 8.9 |
| Example 4 | 9.5 |
| Example 5 | 10.8 |
| Comparative Example 1 | 15.9 |
| Comparative Example 2 | 17.9 |
| Comparative Example 3 | 19.0 |
| Comparative Example 4 | 20.4 |
| Comparative Example 5 | 20.8 |

Referring to Table 3, it can be seen that in the case of the secondary batteries of Examples 1 to 5, the rates of increase in resistance are significantly lower than those of the secondary batteries of Comparative Examples 1 to 5.

All simple modifications and variations of the present invention fall within the scope of the present invention, and the specific protection scope of the present invention will become apparent from the appended claims.

The invention claimed is:

1. A non-aqueous electrolyte solution for a lithium secondary battery, comprising an electrolyte salt, an organic solvent and an additive,
wherein the additive is a lithium salt containing an anion having (1) a sulfone imide group; and (2) a propane sultone group or an ethylene sulfate group.

2. The non-aqueous electrolyte solution for the lithium secondary battery according to claim 1, wherein the additive is represented by Chemical Formula 1:

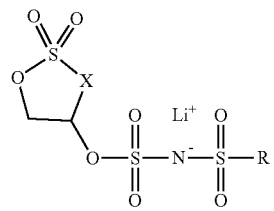

[Chemical Formula 1]

wherein,

X is $CH_2$ or O, and

R is hydrogen, fluorine, or an alkyl group having 1 to 4 carbon atoms substituted with a fluorine.

3. The non-aqueous electrolyte solution for the lithium secondary battery according to claim 2, wherein R is F or $CF_3$.

4. The non-aqueous electrolyte solution for the lithium secondary battery according to claim 2, wherein the additive is represented by any one of Chemical Formula A to Chemical Formula D:

[Chemical Formula A]
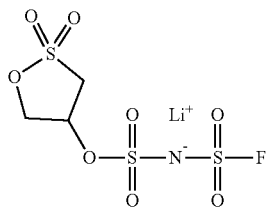

[Chemical Formula B]
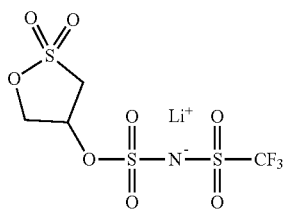

[Chemical Formula C]
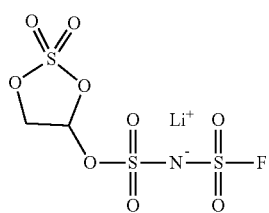

[Chemical Formula D]
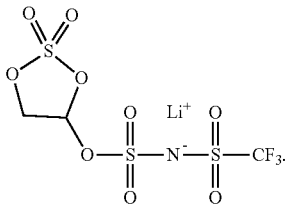

5. The non-aqueous electrolyte solution for the lithium secondary battery according to claim 1, wherein the additive is contained in an amount of 0.01 wt. % to 10 wt. % based on the total weight of the non-aqueous electrolyte solution.

6. The non-aqueous electrolyte solution for the lithium secondary battery according to claim 1, wherein the electrolyte salt is selected from the group consisting of LiCl, LiBr, LiI, $LiBF_4$, $LiClO_4$, $LiB_{10}Cl_{10}$, $LiAlCl_4$, $LiAlO_4$, $LiPF_6$, $LiCF_3SO_3$, $LiCH_3CO_2$, $LiCF_3CO_2$, $LiAsF_6$, $LiSbF_6$, $LiCH_3SO_3$, LiFSI(Lithium bis(fluorosulfonyl)imide, $LiN(SO_2F)_2$), LiBETI(lithium bis(perfluoroethanesulfonyl)imide, $LiN(SO_2CF_2CF_3)_2$) and LiTFSI(lithium bis(trifluoromethanesulfonyl)imide, $LiN(SO_2CF_3)_2$).

7. The non-aqueous electrolyte solution for the lithium secondary battery according to claim 1, wherein the electrolyte salt has a concentration of 0.1M to 3M.

8. The non-aqueous electrolyte solution for the lithium secondary battery according to claim 1, wherein the organic solvent comprises at least one of ethers, esters, amides, linear carbonates, or cyclic carbonates.

9. A lithium secondary battery comprising a positive electrode, a negative electrode, a separator disposed between the positive electrode and the negative electrode, and the non-aqueous electrolyte solution for the lithium secondary battery according to claim 1.

10. The lithium secondary battery according to claim 9, which has an operating voltage of 4.0V or higher.

* * * * *